April 4, 1939.　　　　C. H. VEEDER　　　　2,153,109
THEODOLITE
Filed April 10, 1937　　　　2 Sheets-Sheet 1
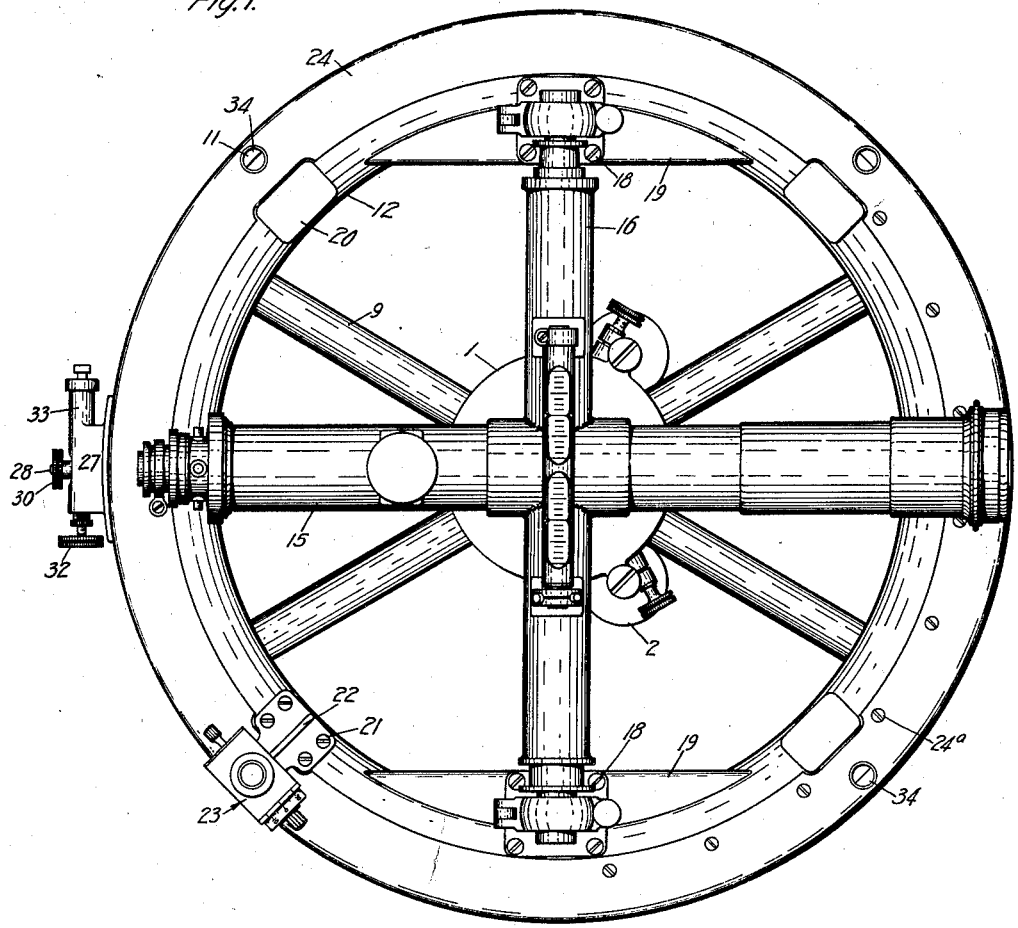
INVENTOR
Curtis H Veeder
By
ATTORNEY

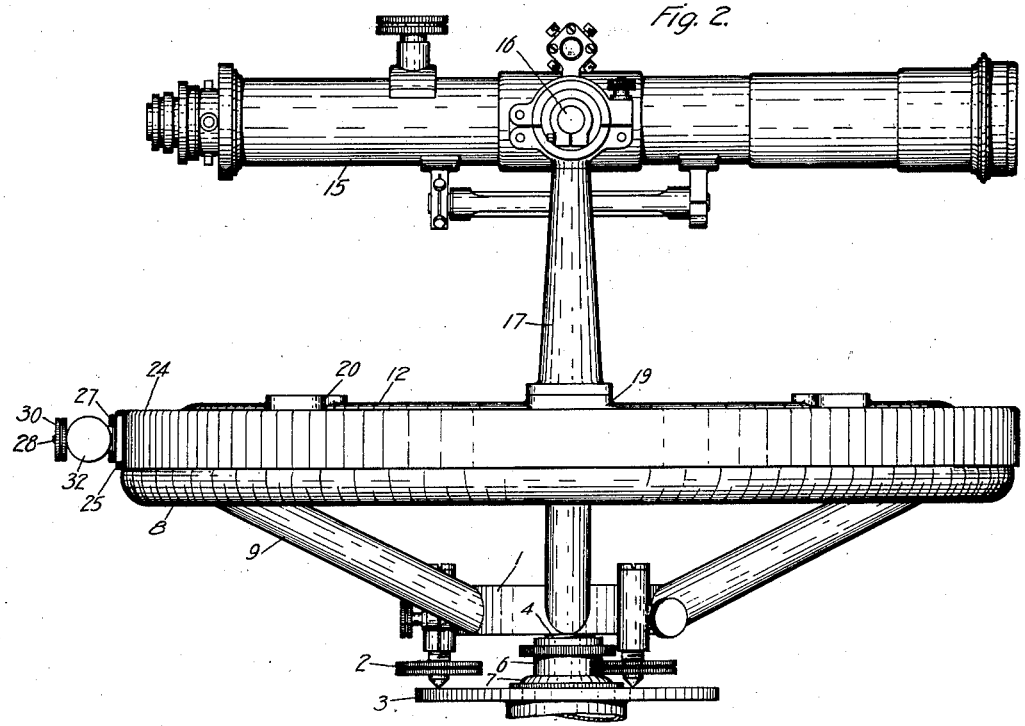
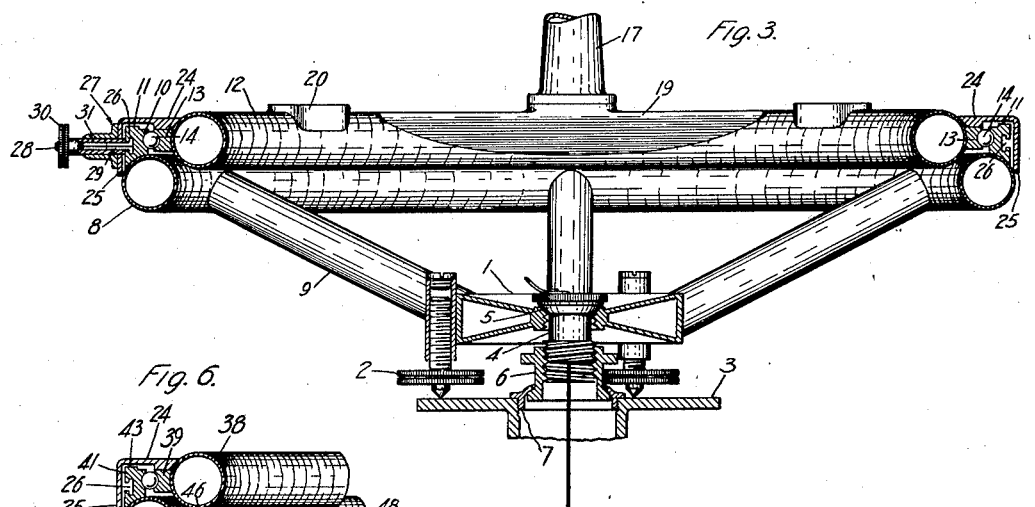
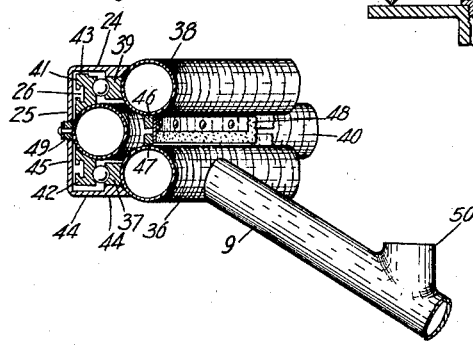
INVENTOR
Curtis H Veeder,
By
ATTORNEY

Patented Apr. 4, 1939

2,153,109

UNITED STATES PATENT OFFICE 2,153,109

THEODOLITE

Curtis H. Veeder, Hartford, Conn.

Application April 10, 1937, Serial No. 136,171

14 Claims. (Cl. 33—72)

My invention relates to theodolites.

In the usual theodolite construction, one or more axial spindles have been provided to support the relatively movable horizontal limb and alidade. This construction is objectionable since a certain amount of clearance is required in each of the spindle bearings to permit a film of lubricating oil between the bearing surfaces, while any lateral play in such an axial bearing directly affects the accuracy of the readings taken on the remote plate circle scale.

My invention has among its objects to provide an improved construction for theodolites by which the accuracy of the instrument is greatly increased. A principal object is to provide an improved supporting structure for the relatively movable horizontal limb and the alidade. Still another object is to provide an improved bearing structure, and more particularly an improved ball bearing structure, located remote from the vertical axis of the instrument and preferably closely adjacent the graduated circle. A further object of my invention is to provide such an improved theodolite also having an improved graduated circle of large diameter and an improved alidade also of correspondingly large diameter having its telescope supports widely spaced and located adjacent the peripheral bearing at the graduated circle. Other objects and advantages of my improved construction will, however, hereinafter more fully appear.

In the accompanying drawings, I have shown for purposes of illustration two embodiments which my invention may assume in practice.

In these drawings,

Figure 1 is a top plan view of a directional theodolite embodying my invention;

Fig. 2 is a side elevation of the theodolite of Figure 1;

Fig. 3 is a vertical sectional elevation with parts broken away;

Fig. 4 is a detail sectional view through the circle and alidade rings, showing one of the micrometer microscopes in elevation;

Fig. 5 is a sectional detail of the alidade clamping means, and

Fig. 6 is a detail sectional view illustrating a modified form of my invention as applied to a repeating theodolite.

In my improved construction, the usual axial bearings are eliminated as well as the circle and vernier plates, and an improved supporting structure is provided of relatively large diameter on which the parts are mounted and adjustable in an improved manner as hereinafter described.

As shown in Figures 1 to 4, my improved directional theodolite comprises a leveling base 1 carrying three leveling screws 2 by means of which the instrument is leveled on a plate 3 carried by the tripod or other support provided at the station from which observations are to be made. The leveling base 1 is connected to the plate 3 for universal movement by means of a tubular member 4 which extends loosely through an axial passage therein and has a universal bearing in a socket 5 at the upper end of the passage and a cooperating tubular member 6, which is adjustably screw-threaded to the lower end of the member 4. The member 6 is also provided with a universal connection to the plate 3 at its lower end by means of a holding ring 7 which is carried by the plate and which has an annular socket portion engaging a bottom peripheral flange of member 6.

The horizontal limb comprises an annular tubular ring 8 which is preferably twenty inches in diameter, i. e. about two and one-half times the diameter usual in theodolites. This ring is rigidly supported above the leveling base 1 by means of six radially disposed upwardly directed tubular arms 9 which are welded at their upper and lower ends to the ring 8 and leveling base 1, respectively, to provide a very rigid but light support for an outer bearing ring 10 which conforms to the circular periphery of the ring 8 and is welded thereto. This bearing ring 10 also constitutes the graduated circle of the horizontal limb and for this purpose is provided with an annular flat top surface 11 carrying the circle graduations.

In accordance with the present invention, while other bearings may be provided, ball bearing means are preferably provided for rotatably supporting the alidade on the horizontal limb. The bearing is located remote from the vertical axis of the instrument and is preferably as close to the graduated circle as possible. The alidade includes a tubular ring 12 which is slightly smaller in diameter than the annular ring 8 and is supported slightly above and within the latter by means of a bearing ring 13, which is welded to the outer periphery of ring 12 and which overlies the ring 8 and is adjacent the cooperating bearing ring 10 thereof. As shown in Fig. 3, the cooperating bearing rings 10 and 13 are provided with cooperating confronting ball grooves to receive the balls 14 which are held in spaced relation throughout the circumference of the bearing by means of usual ball spacers (not shown). Preferably, this bearing is pre-loaded in a well known manner to obtain greater accuracy.

A telescope 15 is journaled on the horizontal axis 16 between widely spaced tubular uprights, or standards, 17 which are removably secured at their lower ends by screws 18 to the tubular ring 12 and to pads 19 welded to the tube at diametrically opposite points to provide rigid seats for the standards at widely spaced points and closely adjacent the annular bearing. Due to the fact that in my improved construction the telescope can swing into the open space within the alidade ring 12, a telescope can be provided having a length approximately equal to the diameter of the ring 8 of the horizontal limb, while the standards 17 can be relatively low, thus providing a most compact instrument of great accuracy.

The alidade ring 12 also has welded to the upper face thereof four pads 20 which are accurately angularly located at 90° positions about the circle. These pads have secured thereto by screws 21 radially outwardly extended brackets 22 which support micrometer microscopes 23 above the graduated circle 11, one of which is shown in Figure 1. These micrometer microscopes are well known in the art, and the specific structure thereof forms no part of my present invention.

Improved means are provided for clamping and adjusting the alidade relative to the horizontal limb. For this purpose, a flat annular ring 24 is removably secured to the upper flat face of the bearing ring 13 by means of screws 24a, a few of which are shown in Fig. 1. This ring 24 overlies the bearing ring 10 and has a depending flange, or apron, 25 which extends down below the bearing ring 10, suitable clearance being provided between the bearing ring 10 and the ring 24 and its apron 25. The apron 25 has a portion 25a (Fig. 5) cut away in the vicinity of a T-shaped slot 26 in the outer periphery of the bearing ring 10, over which portion the clamping bracket 27 is removably secured by suitable screws 25b. A longitudinally split clamping bolt 28 extends loosely through a radial passage 25c in the clamping bracket 27. The bolt 28 has a T-shaped slider 29 disposed in the T-shaped slot 26 and is clamped to the bearing ring 10 by means of a clamping nut 30 and an intermediate sleeve 31 which surrounds the shank of the bolt 28 and has a bifurcated end 31a which receives the slider 29. The bracket 27 has a tangential microscrew 32 bearing against the sleeve 31 and opposing the action of an oppositely located tangential spring 31b in the bracket housing 33 by which the bracket, and hence the alidade, can be moved accurately relative to the fixed radial bolt 28 and sleeve 31 carried by the graduated circle. It will be understood that the T-shaped sliding head on bolt 28 is arcuate to conform to the circumference of the T-shaped slot in the bearing ring 10 and is of sufficient length to avoid binding in the slot when the clamping screw 30 is loosened and the alidade is rotated relative to the horizontal limb. Also, it will be evident that the cut away portion 25a is of sufficient breadth to permit the split bolt 28 to be initially inserted in slot 26 with the halves of the slider 29 disposed in side by side relation. The flat ring 24 has four sight openings 34 opposite the seats 20 and beneath the micrometer microscopes 23, exposing a portion of the graduated scale in each of these locations.

It will be noted that as a result of the improved construction above described and of the increased length of the telescope and the lower standards resulting from the skeleton construction of the horizontal limb and alidade support, an instrument of great precision is provided. Further, it will be noted that by reason of the use of a ball bearing for the rotatable alidade and by the location of the same closely adjacent the graduated circle, I am enabled to avoid inaccuracies due to the necessary clearance formerly required in the axial spindle bearings, while obtaining a much more rigid support for the alidade. It will also be evident that by reason of the large diameter of the graduated circle and the improved widely spaced support of the telescope standards adjacent this circle, the telescope can be leveled with greatly increased accuracy. Also, the provision of clamping means at the periphery of the circle, which acts radially, and the tangential micro-adjusting screw remote from the axis of the alidade, provides a very accurate clamping and adjusting means. It will also be noted that a very light but rigid construction is provided composed largely of welded tubular parts, the inner and outer bearing rings being permanently welded to the tubular members 12 and 8, respectively. I also preferably form the entire structure of Monel metal which insures uniformity of contraction and expansion, while this metal also has the advantage that it is subject to a minimum of change after fabrication.

In Figure 6, I have shown a modified construction which can be used when an instrument of the repeating type is desired. In this construction, the arms 9 are welded at their upper ends to a tubular ring 36 having a bearing ring 37 welded to its outer periphery. An upper ring 38 is provided having a similar bearing ring 39 welded to its outer periphery, and an intermediate bearing ring 40 of slightly larger diameter, having upper and lower bearing rings 41 and 42 welded thereto in position to cooperate with bearing rings 39 and 37, respectively, the cooperating bearing rings having ball receiving grooves in their confronting faces. By reason of this construction, it will be noted that the larger diameter intermediate ring which carries the circle graduations 43, can be rotated relative to the fixed supporting ring 36, and that the alidade ring 38 can be rotated relative to the ring 40. The bearing ring 41 has a T-shaped circumferential slot 26 which cooperates with a bolt 28 and slider 29 as described in connection with Figs. 1 to 3; and the bearing ring 39 is provided with an apertured flat ring 24 having a depending apron 25 carrying the clamping bracket 27 and micro-adjusting screws 32, all as previously described. A similar flat ring 44, but without the apertures 34, is secured to the bottom face of clamping ring 37 and is provided with an upstanding apron 45 similar to apron 25, and supports a second clamping bracket 27 which cooperates with a radial T-shaped split clamping bolt 28 carried by the bearing ring 42. With this construction, it will be evident that the circle can be clamped to the fixed ring 36, while the alidade ring 38 is free for rotation relative to the circle, or the lower clamp can be loosened to permit rotation of the circle with the alidade relative to the ring 36.

Here, also, means are provided for sealing the bearings against entrance of dirt, two annular flanges 46 and 47 being welded to the opposite confronting surfaces of rings 38 and 36. One of these rings, here the top ring, has secured to the inner face thereof, a band of felt 48 which overlies the inner face of the cooperating ring 47 to form a closure against the entrance of dust between rings 38 and 36. A similar piece of felt 49 is secured to the outer ring 40 between the adjacent edges of the annular aprons 25 and 45.

In a repeating theodolite, I also preferably provide flat seats 50 intermediate the ends of the radial arms 9 for the attachment of an annular track to accommodate the horizontally adjustable stop members which are shown and claimed in my Patent No. 2,109,186, issued February 22, 1938; the present construction having the advantages that the track can be located in protected positions inside the graduated circle and out of the way, while being readily accessible for adjustment, while also making possible the use of a continuous track without conflicting with the circle clamping screw.

As a result of my improvements, it will be evident that I have provided an improved skeleton structure for theodolites having improved bearings in an improved location closely adjacent the graduated circle. Further, it will be evident that by reason of the new ball bearing construction and the new location of the bearing, more accurate results can be obtained, due to the nature of the bearing by which the clearance for lubricating purposes is eliminated and also due to the large diameter circle and the close proximity of the bearing thereto. It will further be evident that the increased diameter of the circle permits the telescope to be supported nearer the annular bearings of the instrument, and thereby enables greater accuracy in leveling the telescope, while the open construction by which the telescope can swing within and below the circle permits the use of a longer telescope while still requiring only relatively low telescope standards. It will also be evident that as a result of the welded tube construction employed a very light yet rigid instrument is provided, while the use of Monel metal throughout insures uniformity and permanent accuracy in the finished instrument.

While I have in this application specifically described two embodiments which my invention may assume in practice, it will be understood that the same are shown for purposes of illustration and that the invention may be modified and embodied in various other forms and adapted to other types of instruments without departing from its spirit or the scope of the appended claims.

What I claim as new and desire to secure by Letters Patent is:—

1. In a theodolite, a horizontal limb having a peripheral graduated circle open at the center, an alidade also open at the center, and ball bearing means for rotatably supporting said alidade on said circle providing the sole vertical and lateral support for said alidade.

2. In a theodolite, a horizontal limb including a graduated circle, an alidade, and ball bearing means constituting the sole support for said alidade including annular ball races on said circle and alidade having one race outside the other with the balls between them and disposed between the graduated circle and the vertical axis of said circle for laterally locating and rotatably supporting said alidade on said horizontal limb.

3. In a theodolite, a horizontal limb including a graduated circle ring, an alidade ring, ball bearing means providing the sole vertical and lateral support for said alidade including ball races on said circle ring and alidade ring one outside the other with the balls between them and disposed between said circle and alidade rings and supporting and laterally locating the alidade ring on said limb, and peripheral clamping means on said alidade ring acting to exert a tangential thrust on said circle ring.

4. In a theodolite, a support, a horizontal limb including a tubular ring open at the center and carrying a graduated circle, an alidade including a ring also open at the center, and ball bearing means interposed between said rings for laterally positioning and rotatably supporting said alidade on said horizontal limb.

5. In a theodolite, a support, a horizontal limb including a tubular ring carrying a graduated circle and open at the center, an alidade including a tubular ring also open at the center and located adjacent to said first mentioned ring, and ball bearing means between said rings laterally positioning and rotatably supporting said alidade on said horizontal limb and constituting the sole support for said alidade.

6. In a theodolite, a horizontal limb comprising a leveling plate and a skeleton frame thereabove including radially and upwardly directed supporting arms terminating at the top in a ring, and an alidade including a ring journalled on the ring of said limb, the journal for said alidade comprising ball bearing means constituting the sole support for said alidade, and said horizontal limb and alidade having the space within the rings thereof unobstructed above said plate.

7. In a theodolite, a horizontal limb including a graduated circle, and an alidade including a supporting ring open at the center having a bearing on said horizontal limb adjacent said circle and a telescope journalled on a horizontal axis above said ring and swinging through an arc intercepting the plane of said ring in the open space at the center thereof.

8. In a theodolite, a horizontal limb including an annular ring open at the center having a graduated circle, and an alidade including a supporting ring also open at the center having a bearing on the ring of said horizontal limb adjacent said circle and also including a telescope pivoted on a horizontal axis having a free end movable into the space inside said circle.

9. In a theodolite, a horizontal limb comprising a ring open at the center, a peripheral graduated circle carried on said limb, means supporting said horizontal limb from below providing an open space within said ring and said supporting means and below said circle, and an alidade comprising a ring open at the center and journalled on said horizontal limb at said circle and a telescope movable about a horizontal axis and supported on standards carried by said alidade ring and having one of its extremities swinging into the open space within said horizontal limb and below said circle.

10. In a theodolite, a concave horizontal limb including radially and upwardly directed arms terminating in an upper annular rim, an alidade including an annular ring journalled on said rim, the space within said concave limb and within the ring of said alidade being unobstructed, and a telescope mounted on a horizontal axis above said ring and rotatable about its axis through said unobstructed space.

11. In a theodolite, a horizontal limb including an annular ring open at the center having a graduated circle, an alidade including a supporting ring also open at the center having a bearing on the ring of said horizontal limb adjacent said circle and also including a telescope, and telescope supporting standards on said alidade supporting said telescope above the center openings in said horizontal limb and alidade and secured to the latter at diametrically opposite points adjacent said bearing.

12. In a theodolite, an annular support, a graduated circle, an alidade, rotary bearing means adjacent said graduated circle for laterally locating and rotatably supporting said alidade, rotary bearing means between said circle and said support, and releasable clamping means for selectively securing said circle in different angular relations relative to said alidade and to said support.

13. In a theodolite, an annular support, an alidade, an annular member between said support and alidade, and bearing means between said support and alidade for rotatably supporting said alidade on said support including ball bearing means between said annular member and both said support and said alidade.

14. In a theodolite, an annular support, a graduated circle, an alidade, bearing means adjacent said graduated circle for laterally locating and rotatably supporting said alidade, bearing means between said circle and said support, and releasable clamping means for selectively securing said circle to said alidade and to said support, said bearings comprising ball bearings and cooperating bearing rings therefor carried on said support, circle and alidade.

CURTIS H. VEEDER.